(No Model.)
E. KIPPER.
PROCESS OF AND APPARATUS FOR MAKING SOLID RINGS OF PLASTIC COMPOUNDS.
No. 299,802. Patented June 3, 1884.
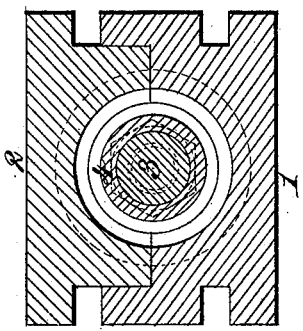
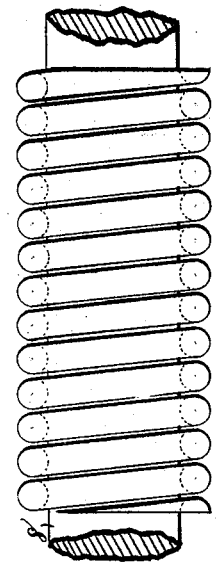
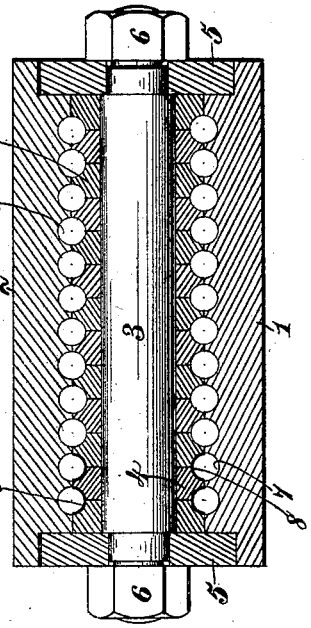
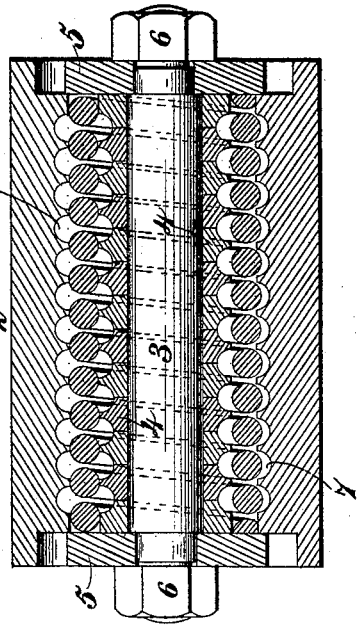
Witnesses.
Robert Emmett.
J. A. Rutherford
Inventor.
Emil Kipper.
By James L. Norris.
Atty.

UNITED STATES PATENT OFFICE.

EMIL KIPPER, OF ADAMS, MASSACHUSETTS.

PROCESS OF AND APPARATUS FOR MAKING SOLID RINGS OF PLASTIC COMPO

SPECIFICATION forming part of Letters Patent No. 299,802, dated June 3, 1884.

Application filed November 13, 1883. (No model.)

*To all whom it may concern:*

Be it known that I, EMIL KIPPER, a subject of the King of Prussia, residing at Adams, in the county of Berkshire and State of Massachusetts, have invented new and useful Improvements in the Process of and Apparatus for Making Solid Rings of Plastic Compounds, of which the following is a specification.

This invention relates to the manufacture of solid rings from plastic material, such as zylonite, celluloid, or other pyroxyline compounds, and has for its objects to provide an improved method of forming the rings, to provide a novel molding-die for producing the rings from plastic material, and to facilitate the entrance of the material into the molding-die. These objects I accomplish in the manner and by the means hereinafter described and claimed, reference being had to the accompanying drawings, in which—

Figure 1 represents portion of a mandrel, the plastic material in the form of a rod being wound spirally thereon while heated or warm and permitted to cool; Fig. 2, a longitudinal sectional view of my apparatus, showing the spiral rod of zylonite in place to be converted into concentric rings; Fig. 3, a sectional elevation of the apparatus, showing a dozen disconnected rings produced according to the invention; and Fig. 4, a transverse sectional view of the apparatus.

Referring to the drawings, it will be seen that the molding-die is composed of a bottom or base, No. 1, a top or cover, 2, and a cylindrical spindle, 3, which, in conjunction with a series of separate forming-rings, 4, constitute the compound mandrel, such rings being centrally perforated and the spindle passing through them and the end washers or heads, 5, which are confined in proper position in recesses in the ends of the base and top sections by means of nuts 6, screwed on threaded projecting ends of the spindle. The top and bottom sections, 1 and 2, are turned out interiorly to form semicircular recesses 7 in each, which are coincident with each other when the sections are properly placed together, thereby constituting annular semicircular concentric grooves, and the forming-rings 4 are recessed or grooved at their peripheral edges in such manner that when two are placed side by side a semicircular groove will be created corresponding to and directly opposite the recess or groove in the two sections 1 and 2 of the molding-die. A series of the forming-rings being placed upon the spindle, and the latter arranged centrally between the upper and lower sections and secured as described, a series of concentric annular cavities will be formed, into which the plastic material may be forced for molding the same into rings, as I will now explain. The zylonite or similar plastic compound, having been produced in rod form, is wound about a mandrel or stick, 8, Fig. 1, until ready for use. It is then taken off the same and placed upon the composite spindle-mandrel 3 and 4 and encircling spirally the rings and not coinciding with their grooved edges, since the latter are parallel to each other and not spiral or in the form of a screw. The spindle 3 is now placed between the two sections of the die, as in Fig. 2, and, after the application of suitable heat, pressure is applied, forcing the two sections together and causing the material forming the spiral rod to rearrange itself upon the rings and fill the recesses, resulting, by their union with the recesses of the upper and lower sections of the die, in the change of the plastic material from the spiral form into that of a series of concentric rings, as in Fig. 3. Having thus formed the rings and caused the surplus material to pass off in the form of overflow, the die is cooled and opened, and by removing the nuts 6 the spindle 3 is readily withdrawn and the series of forming-rings 4 and the formed plastic rings are removed, ready for finishing. The forming-rings 4 are now again replaced on their spindle 3 and encircled with another spiral of plastic composition, and then placed in the upper and lower sections of the die, which is heated and closed by pressure, thereby producing another set of concentric rings, which are taken off, as above described, and thus the operation is repeated.

It is obvious that, instead of the spiral rod, a tube or a sheet of composition may be used to envelope the rings 4 on the spindle 3.

It is also obvious that the interior surface of the rings may be lined with metal by placing such metal pieces in the recess of the rings as they are being placed upon the spindle, as shown at 8, Fig. 3.

I am aware that solid rings have been made from pyroxyline compounds, but heretofore, in making such rings from the plastic material through the medium of dies, a rod of the appropriate size is first made and then cut into sections, each of such length that when bent and its ends brought together a ring of the desired size is produced, such ring being then introduced into a heated mold or die for welding the said ends together. This same method is practiced in making tubular rings, with the addition that a dowel-pin is inserted in the ends of the section, and after removing the welded ring from the die it is placed between pieces which, when united, have an annular groove in their peripheries, this contrivance being used to hold the ring until it is perfectly dry, thus preventing the ring from twisting or warping. In contradistinction to such methods, I first produce a spiral rod, and by pressure in a die of novel construction convert such rod into a series of detached concentric completed rings, thus avoiding the necessity of subdividing a spiral rod into sections, then bringing the ends of each section together, and finally welding the said ends in a die, which requires the exercise of considerable care and skill and involves the loss of time.

Having thus described my invention, what I claim is—

1. The die composed of two sections constructed on the interior with a series of concentric grooves of semicircular form, and devices, such substantially as described, arranged in said die, for converting a spiral rod into detached concentric completed rings, as set forth.

2. The combination of the die composed of two sections constructed on the interior with a series of concentric grooves of semicircular form, and a spindle supported in the die, and provided with a series of forming-rings having annularly-grooved peripheries for converting a spiral rod into detached concentric completed rings, substantially as described.

3. The combination of the die composed of two sections constructed with a series of concentric grooves of semicircular form, the removable heads closing the ends of the die, the spindle supported centrally in the die by the heads, and the forming-rings on the spindle, provided with annularly-grooved peripheries, for converting a spiral rod into a series of detached concentric completed rings, substantially as described.

4. The process herein described of making solid rings from plastic material, which consists in first converting the material into spiral form, and then pressing it into concentric solid rings, substantially as specified.

5. The process herein described of making solid rings from plastic material, which consists in converting material into a spiral rod, placing it into a die having concentric annular grooves, and pressing the spiral rod into the grooves to convert it into concentric solid rings, substantially as described.

6. The process herein described of making solid rings of a plastic substance, which consists in enveloping a compound mandrel with the material to serve as a supply from which to mold rings concentrically in such die, substantially as specified.

In testimony whereof I have hereunto set my hand and seal in the presence of two subscribing witnesses.

EMIL KIPPER. [L. S.]

Witnesses:
RUSL. B. DEAN,
S. W. INGALLS.